Aug. 22, 1950  G. H. BROWN  2,519,431
ELECTRIC TEAKETTLE AND COVER ASSEMBLY
Filed June 7, 1944  2 Sheets-Sheet 1

INVENTOR.
Gordon H. Brown.
BY
Edwin J. Balluff
ATTORNEY.

Aug. 22, 1950  G. H. BROWN  2,519,431
ELECTRIC TEAKETTLE AND COVER ASSEMBLY
Filed June 7, 1944  2 Sheets-Sheet 2
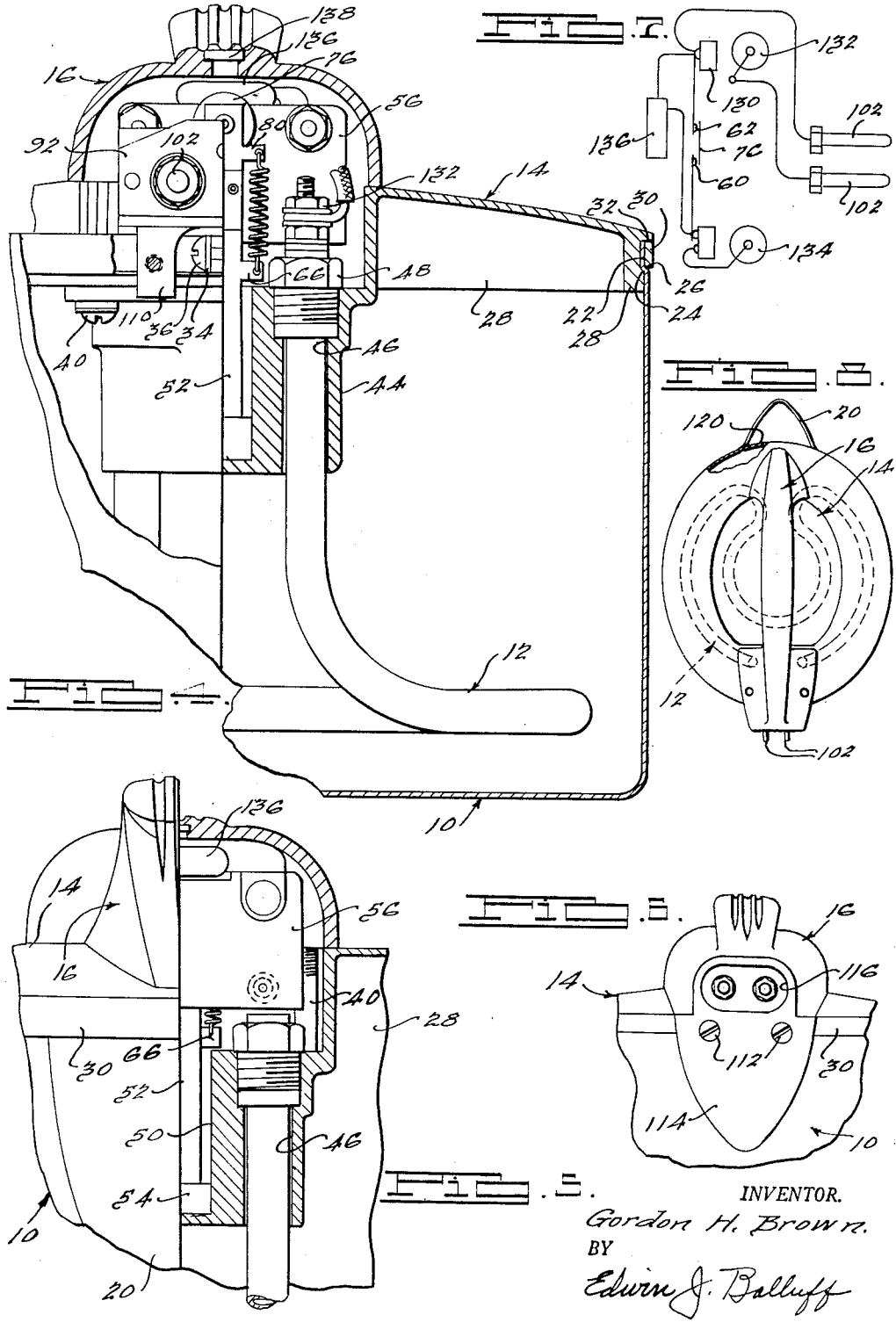
INVENTOR.
Gordon H. Brown.
BY
Edwin J. Balluff
ATTORNEY.

Patented Aug. 22, 1950

2,519,431

UNITED STATES PATENT OFFICE 2,519,431

ELECTRIC TEAKETTLE AND COVER ASSEMBLY

Gordon H. Brown, Detroit, Mich.

Application June 7, 1944, Serial No. 539,201

1 Claim. (Cl. 222—572)

This invention relates to electric teakettles.

Principal objects of the invention are to provide:

A new and improved electric teakettle;

An improved construction and assembly for the parts of an electric teakettle;

An electric teakettle in which the shell thereof is unpierced below the water line and in which all of the mechanism is mounted on the cover of the teakettle; and An electric teakettle having a new and improved form of cover and shell and assembly thereof.

Other objects and advantages of the invention will be apparent from a consideration of the following specification taken in conjunction with the accompanying drawings of which there are two sheets and wherein:

Fig. 4 is an enlarged vertical sectional view through the thermostatic safety switch and resetting mechanism but with some of the parts shown in elevation;

Fig. 5 is a fragmentary front elevational view with certain parts of the handle and shell broken away;

Fig. 6 is a fragmentary rear elevational view;

Fig. 7 is a schematic view illustrating the wiring diagram; and

Fig. 8 is a plan view on a reduced scale with certain parts thereof broken away.

Figures 1, 2, 3:
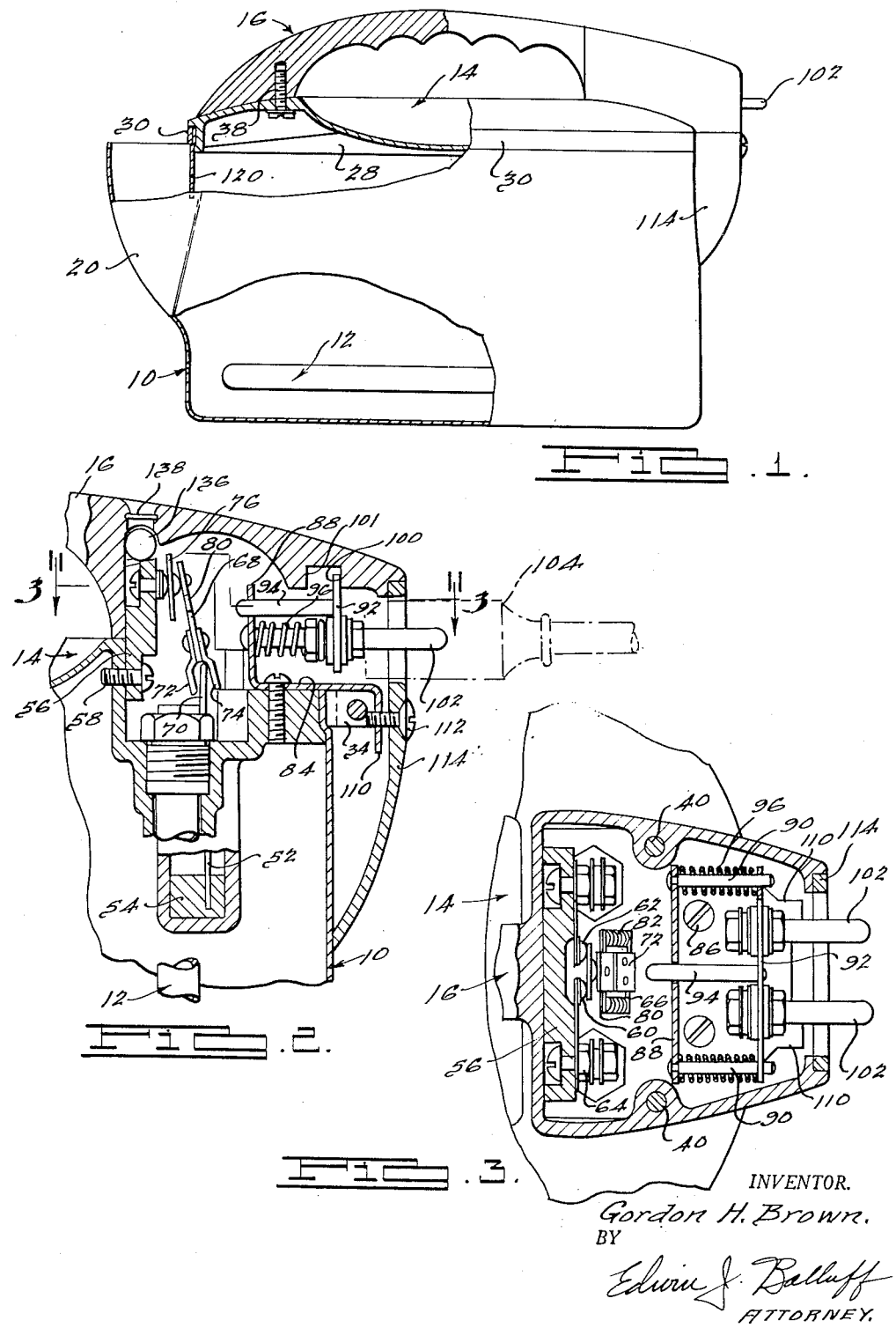
Fig. 1 is a side elevational view of an electric teakettle embodying the invention, certain of the parts thereof being broken away.
Fig. 2 is an enlarged sectional view of the thermostatic safety switch and resetting mechanism.
Fig. 3 is a horizontal sectional view taken along the staggered line 3—3 of Fig. 2.

In general an electric teakettle embodying the invention comprises a shell 10 having a heating element 12 therein, a cover 14, a handle 16, and thermostatic safety switch and resetting mechanism which is partially illustrated in Figs. 2 and 3.

The shell 10 may be formed by a stamping of aluminum or other suitable material to provide a vessel which may be of generally oval shape for holding water and a pouring and filling spout 20. The side and bottom walls of the shell 10 need not be and are not pierced or apertured in order to carry out the invention herein disclosed. The rim 22 of the shell 10 is offset slightly inwardly to provide an inner shoulder 24 and an outer shoulder 26 which extend completely around the shell except for that portion thereof forming the spout 20.

The cover 14 may be formed of a die casting of aluminum or other suitable material and is assembled on the shell in such a manner as to close the top of the same except for the opening provided by the spout 20. The cover includes a depending marginal flange 28 having its outer periphery shaped to fit within the rim 22 of the shell and under the inner shoulder 24 thereon. While the outside dimensions of the lower part of the flange 28 are greater than the inside dimensions of the rim 22, the opening of the shell 10 defined by the rim 22 may be enlarged sufficiently to permit the assembly of the cover 14 thereto due to the fact that the rim 22 and the upper walls of the shell 10 at the front are interrupted by the spout 20.

After the cover 14 has been properly assembled on the rim 22 with the flange 28 arranged within the rim 22 and below the shoulder 24, a band 30 of metal or other suitable material is arranged externally on the rim 22 and between the shoulder 26 and the laterally projecting marginal edge 32 of the cover which seats upon the top of the rim 22. At the back of the kettle the ends of the band are turned laterally outward to provide spaced ears 34 having aligned bolt holes therein. The ears 34 are clamped together, so as to clamp the rim 22 securely against the flange 28 of the cover, by a bolt 36, the shank of which extends through the aligned openings in the ears 34 and has a nut (not shown) secured to the threaded end thereof. In this way the cover 14 is detachably secured to the shell 10.

The handle 16, which may be formed of plastic or other suitable material, at its front is secured to the cover by a bolt 38 and at its rear by two bolts 40. As the heads of the bolts 38 and 40 are on the underside of the cover 14, the handle 16 must be assembled to the cover 14 before the same is assembled to the shell 10. In addition, all of the apparatus or mechanism is assembled to the cover 14, and such assembly must take place before the cover 14 is secured to the shell 10. The rear of the handle is enlarged and made hollow so as to cooperate with a suitable depression or recess formed in the cover 14 at the rear thereof to provide an enclosure or housing for the thermostatic safety switch and resetting mechanism.

The cover 14 below the aforementioned recess at the back thereof is formed to provide a depending part 44 upon which the heating element is mounted. Such part 44 includes a pair of sockets 46 in which the ends of the heating element 12 are secured. The heating element may comprise an electric resistance heating element of the type in which an electric resistance is embedded in a refractory insulation encased in a tube or sheath. The heating element 12 is arranged in the form of a loop which is arranged adjacent the bottom of the shell 10. The upper ends of the sockets 46 are threaded to receive nuts 48 which cooperate with packing in the sockets 46 and the ends of the element 12 for securing the same in place. Between the sockets 46 a well 50 is formed in the depending part 44.

The bimetallic element 52 of a thermostatic safety switch has its lower end embedded in a mass of metal 54 disposed in the bottom of well 50. An insulating block or panel 56 is mounted at the front of the recess and on the cover 14 by bolts 58, and this insulating block 56 has mounted thereon spring mounted contacts 60 and 62, each of the contacts being carried by a strip which is bolted by a bolt and nut assembly 64 to the block 56. The upper end of the bimetallic element 52 is in the form of a cross and includes laterally extending arms 66. A lever assembly 68 is mounted on the upper knife edge of the part 70 of the bimetallic element 52 which projects above the arms 66. The lever assembly 68 includes a U-shaped lower end, the legs 72 and 74 of which straddle the part 70 as illustrated in Fig. 2.

A lining (not shown) may be arranged inside the U-shaped lower end of the lever assembly 68 so that the latter is free to rock or slide upon the knife edge which is provided on the top of the upper end 70 of the bimetallic element, and suitable means may be employed to keep the lever assembly 68 in place on the upper edge of element 52.

The upper end of the lever assembly has universally mounted thereon a bridge 76 which bridges the contacts 60 and 62 when the parts are arranged as illustrated in Figs. 2 and 3. In this position the circuit through the heating element 12 is closed.

The bimetallic element 52 and lever 68 comprise a toggle mechanism for automatically opening the switch (comprising the contacts 60, 62 and the bridge 76) when the temperature of the heating element becomes excessively high, which usually happens when the teakettle is operated for too long a time without an adequate amount of water in the shell 10, the heat being conducted through the outer wall of the element 12 to the part 44 and thence through the metal 54 to the bimetallic element 52. During normal operation the bimetallic element 52 and lever 68 are in the position illustrated. However, when the temperature of the heating element 12 becomes too high, as previously described, the upper end 70 of the bimetallic element 52 will move to the left (Fig. 2) sufficiently to throw the upper end of the lever 68 to the right sufficiently to move the bridge 76 so as to open the switch.

The lever 68 includes laterally extending arms 80. Springs 82 connected to the arms 80 of the lever 68 and the arms 66 of the bimetallic element 52 bias the bridge 76 either towards or away from the contacts 60 and 62. As the bimetallic element 52 heats up, the upper end 70 thereof moves gradually to the left (Fig. 2) and as soon as the arms 80 of the lever 68 move to the right past the knife edge on the upper end 70 of the bimetallic element, the springs 82 will snap the lever to the right thereby rapidly opening the switch. For the sake of clarity, the springs 82 are omitted from Fig. 2.

In order to close the switch it is necessary to reset the same, and this is accomplished in the following manner and with the use of the following resetting mechanism. A plate 84 mounted by bolts 86 on the cover 14 is turned up at one end to provide a wall 88 which has rigidly mounted thereon two rearwardly extending pins 90. The pins 90 extend through guide holes in a plate 92. Plate 92 has securely mounted thereon a forwardly extending pin 94 which extends through a hole in the wall 88. The pins 90 are surrounded by springs 96 which bias the plate 92 to the position in which it is illustrated in Figs. 2 and 3. A shoulder 100 formed on the handle limits the rearward movement of the plate 92. Thus the plate 92 is mounted on the wall 88 and for reciprocating movement relative thereto by the pins 90 and 94.

The plate 92 carries prongs forming terminal connectors 102 which are adapted to fit within the terminal sockets carried by a conventional plug 104 on the end of a current conductor. The enclosure formed by the cover 14 and the handle 16 which encloses the thermostatic safety switch and resetting mechanism is open at the back so that such plug may be operatively associated with the terminals 102 which through the thermostatic safety switch are operatively connected with the heating element 12.

The pin 94 is adapted to contact the lever 68, when the thermostatic safety switch is open, for resetting the same. This resetting operation is accomplished when the plug 104 is mounted on the terminals 102 by pushing the plug forwardly or to the left, looking at Figs. 2 and 3. This causes a forward movement of the plate 92 and pin 94 which will engage the lever 68 if the switch is open and push it past the center of the toggle for closing the safety switch, provided that the heating element 12 and bimetallic element 52 have cooled down sufficiently to allow the switch to be closed.

The rear end of the plate 84 has two downwardly extending tabs 110, each of which is provided with a threaded hole with which a screw 112 is cooperable for removably securing in place the terminal shroud 114 which conceals the joint between the handle and the shell 10 at the rear of the kettle. The shroud 114 is shaped to fit the edges of the handle and the back of the shell and has an opening 116 for the plug 104 and through which the terminals 102 project.

As the rim 22 does not extend across the spout 20, a lip 120 may be inserted between the band 30 and the flange 28 of the cover to bridge the spout. This lip extends downwardly between the spout 20 and the shell 10 for a short distance.

The leads between the various terminals have been omitted for the sake of clarity, but the circuit is indicated in Fig. 7 wherein it appears that one of the terminals 102 is connected to a terminal 130 for the contact 62. The other terminal 102 is connected to a terminal 132 of one end of the heating element 12 while the other terminal 134 of the heating element 12 is connected to the terminal for the switch contact 60.

A signal light comprising a resistance 136 may be connected across the terminals of the switch contacts 60 and 62 and arranged so that when such contacts are open the signal will be illuminated. The signal may be mounted above the panel 56 and be visible through a window 138 arranged in the handle 16 above the light 136.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claim.

I claim:

A teakettle comprising a shell having enclosing side walls provided at their upper end with an expansible and contractible rim forming an inwardly offset downwardly facing shoulder on the interior of said shell, said side walls being formed to provide a spout which interrupts the continuity of said rim and shoulder thereby allowing expansion and contraction of said rim and shoulder, a removable and replaceable cover having a marginal portion provided with a shoulder complementary in shape to that of said downwardly facing shoulder and arranged so that said shoulder on said cover is arranged within said shell and below and against said interior shoulder on said shell, said cover extending across and closing the top of said shell except for said spout, and a removable and replaceable contractible band encircling said rim and clamping the same against said marignal portion of said cover thereby to removably secure said cover to said shell.

GORDON H. BROWN.

REFERENCES CITED

The following references are of record in the file of this patent:

UNITED STATES PATENTS

| Number | Name | Date |
|---|---|---|
| 121,770 | French | Dec. 12, 1871 |
| 210,320 | Graham | Nov. 26, 1878 |
| 508,066 | Tilger et al. | Nov. 7, 1893 |
| 639,473 | Ward | Dec. 19, 1899 |
| 684,069 | Knorr | Oct. 8, 1901 |
| 788,642 | Happer | May 2, 1905 |
| 797,955 | Happer | Aug. 22, 1905 |
| 817,314 | Hahn | Apr. 10, 1906 |
| 1,011,209 | Killion | Dec. 12, 1911 |
| 1,273,821 | Causton | July 30, 1918 |
| 1,571,134 | Mittinger | Jan. 26, 1926 |
| 2,027,537 | Kircher | Jan. 14, 1936 |
| 2,092,772 | Nadelson | Sept. 14, 1937 |
| 2,135,313 | Nolte | Nov. 1, 1938 |
| 2,286,470 | Dafforn et al. | June 16, 1942 |

FOREIGN PATENTS

| Number | Country | Date |
|---|---|---|
| 14,297 of 1911 | Great Britain | Sept. 28, 1911 |